ns,953

Patented Jan. 26, 1926.

UNITED STATES PATENT OFFICE.

MADS POULSEN EBBESEN, OF FREDERIKSBERG, NEAR COPENHAGEN, DENMARK.

PACKING MATERIAL.

No Drawing.  Application filed March 10, 1925.  Serial No. 14,564.

*To all whom it may concern:*

Be it known that I, MADS POULSEN EBBESEN, subject of the King of Denmark, residing at Frederiksberg, near Copenhagen, Denmark, have invented certain new and useful Improvements in Packing Materials, of which the following is a specification.

The object of the present invention is to provide a plastic, nonresilient packing material, which does not change its packing properties under the influence of pressure, heat, moisture or the atmosphere and which is adapted to form tight joints between tubes, flanges, fittings or other mechanical members, without the necessity of using any solid packing material such as leather, gum, hemp, paper or the like. The material forming the object of the present invention consists in a mixture of a vegetable or animal fat or oil, alkali, graphite, chalk, alkali-carbonates, starch, sugar and water-glass, which materials are mixed together to form a mass having the consistence of a paste or salve, such as butter or putty. If desired a suitable colouring agent such as pine-soot may be added to the mixture.

The different ingredients of which the present packing material is composed may be used in any suitable proportions.

A material of the present kind may for instance be prepared in the following manner.

1000 grams of a fatty material such as animal fat, train-oil, linseed oil, hemp-oil, turnip-oil, resin or the like are saponificated with caustic potassium or sodium to form a smooth pulp, and 200 grams of waterglass and 150 grams of starch, mixed with a solution of potassium carbonate or sodium carbonate, and a small amount, for instance 20–100 grams of sugar is added to the pulp during or after the saponification.

100 grams of the mixture thus formed are mixed with 50 grams of graphite and 20 grams of chalk to form a mass having the consistence of butter or putty. If desired a small amount of a colouring material, for instance 10 grams of pine-soot, may be added to the mass.

The packing material thus formed is smeared in a smooth thin layer upon the surfaces to be packed, for instance upon the screw threads on a tube designed to be screwed into a fitting, or upon the faces of two flanges designed to be connected tightly together, and the parts are then fastened tightly together without requiring the use of any additional packing of any character.

If used on steam tubes and the like, the present material will stiffen under the influence of the heat but will not lose its packing property.

Having now particularly described and ascertained the nature of my said invention and in what manner the same is to be performed, I declare that what I claim is:

1. Plastic, non-resilient packing material, comprising a saponified fatty substance, water-glass, starch, an alkali carbonate, graphite and chalk.

2. A process of making a plastic, non-resilient packing material, comprising the steps of saponifying a fatty substance with an alkali; adding to the soap thereby formed a mixture of water-glass, starch, an alkali carbonate and sugar; and mixing graphite and chalk with the resultant product.

In testimony whereof I affix my signature.

MADS POULSEN EBBESEN.